US006832072B2

(12) United States Patent
Buckingham et al.

(10) Patent No.: US 6,832,072 B2
(45) Date of Patent: Dec. 14, 2004

(54) WIRELESS SWITCH

(75) Inventors: Duane W. Buckingham, Old Lyme, CT (US); Philipp Roosli, Mountain Lakes, NJ (US); David Oliver, Old Lyme, CT (US); Rick Quirino, Discovery Bay, CA (US)

(73) Assignee: Inncom International, Inc., Old Lyme, CT (US)

( * ) Notice: Subject to any disclaimer, the term of this patent is extended or adjusted under 35 U.S.C. 154(b) by 613 days.

(21) Appl. No.: 09/944,810

(22) Filed: Aug. 31, 2001

(65) Prior Publication Data

US 2003/0045239 A1 Mar. 6, 2003

(51) Int. Cl.[7] .................................................. H04B 7/00

(52) U.S. Cl. ................................ 455/66.1; 379/102.05; 379/102.06

(58) Field of Search .................... 455/66.1; 379/102.05, 379/102.06

(56) References Cited

U.S. PATENT DOCUMENTS 3,833,895 A 9/1974 Facteau ...................... 340/224
4,804,945 A 2/1989 Millet ........................ 340/541
4,850,040 A 7/1989 Teich et al. ................. 455/603
4,887,205 A * 12/1989 Chou ......................... 364/400
5,128,792 A 7/1992 Teich et al. ................. 359/161
5,402,105 A 3/1995 Doyle et al. ................ 340/539
5,903,226 A * 5/1999 Suman et al. .......... 340/825.69
5,933,085 A 8/1999 Holcomb et al. ...... 340/825.31
5,986,548 A 11/1999 McGregor .................. 340/539
6,072,402 A * 6/2000 Kniffin et al. ............ 340/5.28
6,137,405 A 10/2000 Carney ...................... 340/541

OTHER PUBLICATIONS

PCT Notification Of Transmittal Of The International Search Report Or The Declaration for International Application No. PCT/US02/22925; International Filing date: Jul. 18, 2002.

* cited by examiner

*Primary Examiner*—Creighton Smith
(74) *Attorney, Agent, or Firm*—Cantor Colburn LLP

(57) ABSTRACT

A wireless switch comprising: a sensor for sensing a change of a state of a barrier; a selector positionable between a first position and a second position; a transmitter operatively coupled to the sensor and selector; and wherein the transmitter transmits a first wireless signal when the selector is positioned in the first position and the sensor senses a change of state, and the transmitter transmits a second wireless signal different from the first signal when the selector is positioned in the second position and the sensor senses the change of state.

23 Claims, 3 Drawing Sheets

WIRELESS SWITCH

BACKGROUND OF THE INVENTION

Energy conservation is a proven means to reduce the operating costs of hotels. But many lodging facility operators shun attempts at saving energy in the guest-rooms, as they are concerned about the negative impact that such measures may have on guest perception and comfort.

A modern guestroom uses approximately 25 Kilowatt-hours (KWHr) of electricity (or equivalent fuel) each day. Based on a cost estimate of $0.07 per KWHr, this amounts to about $1.75 per day per room. This figure assumes the following appliances are used in a typical room: Heating/Ventilation/Air-Conditioning (HVAC), lamps (portable), lights (fixed), television, radio, and minibar. A mini-bar is a convenient store of goods within each room, usually within a refrigerator, that can be accessed by the guest at his or her discretion.

With the exception of the minibar, the electrical power consumption by the appliances is manually controlled, and the amount of electricity used by these appliances can be reduced using an energy management system (EMS). In the case of the HVAC system, a well-designed EMS can reduce not only the number of hours the HVAC system is used each day, but can also reduce the average power required. The EMS can set back the HVAC temperature whenever a room is not rented and, when rented, whenever a guest is not in the room. The EMS will turn off lamps and lights when the guest or housekeeping leaves the room. The EMS can turn off the television when the room is not rented, and it can open or close the drapes to control heat exchange with the outside.

In modern lodging facilities, the EMS is part of a larger guest room control system, which also includes a direct digital control (DDC) system and a central electrical lock system (CELS). The DDC system allows a guest to remotely control the lamps, lights, shades, television, and other appliances from a single control station. The CELS connects guestroom doors to a central computer in the hotel for logging keycard access operations and for enabling and disabling access cards.

Guest room control systems typically comprise a control computer or device for each room. The control computer receives data from various sensors throughout the room and, in response to the feedback provided by the sensors, operates a number of remote room control devices. Such remote sensors include, for example, motion sensors, temperature sensors, smoke detectors, and door and other closure switches. Such remote room control devices include, for example, thermostats and associated relays for heating, ventilation and air conditioning (HVAC) equipment, electronic locks, lighting control switches and relays, and motors and switches for opening and closing drapes. The central control computer uses the data and control devices to, for example, adjust the room's temperature, determine and annunciate whether the room is occupied or unoccupied, determine and annunciate whether the room's mini-bar has been accessed, sound fire and emergency alarms, turn lights on or off, permit or deny access to the room, open and close drapes, turn audio-visual equipment on or off, and perform other functions related to controlling equipment or annunciating status in rooms. The central control computer located in each room can be linked to a single master central control computer. The central control computer from each room provides data to the master central control computer from which such data is disseminated to display and control terminals at housekeeping, front desk, security, engineering or any number of other locations in order to provide hotel personnel with access to the data and with the ability to remotely control various room functions or settings from such terminals.

Such guest room control systems work well to provide conveniences to the guest. However, these systems typically require a specific sensor for a specific purpose, thus, many different sensors may be required for a single guest room. For example, a main switch is used to determine whether a guest opened the main door. Another switch is used to determine whether the guest opened the mini-bar door. Yet another switch is used to determine whether the guest opened a door to a patio, such as a lanai or sliding door. Therefore, a number of different sensors (and corresponding receivers) may be incorporated in a guest room. While multiple sensors provide greater control of the power consumption for a guest room, the system installation, operation and maintenance becomes more complex and costly.

BRIEF SUMMARY OF THE INVENTION

The above discussed and other drawbacks and deficiencies are overcome or alleviated by a wireless switch comprising: a sensor for sensing a change of a state of a barrier; a selector positionable between a first position and a second position; a transmitter operatively coupled to the sensor and selector; and wherein the transmitter transmits a first wireless signal when the selector is positioned in the first position and the sensor senses a change of state, and the transmitter transmits a second wireless signal different from the first signal when the selector is positioned in the second position and the sensor senses the change of state.

BRIEF DESCRIPTION OF THE DRAWINGS

Referring to the exemplary drawings wherein like elements are numbered alike in the several Figures.

DETAILED DESCRIPTION OF THE INVENTION

Figure 1:
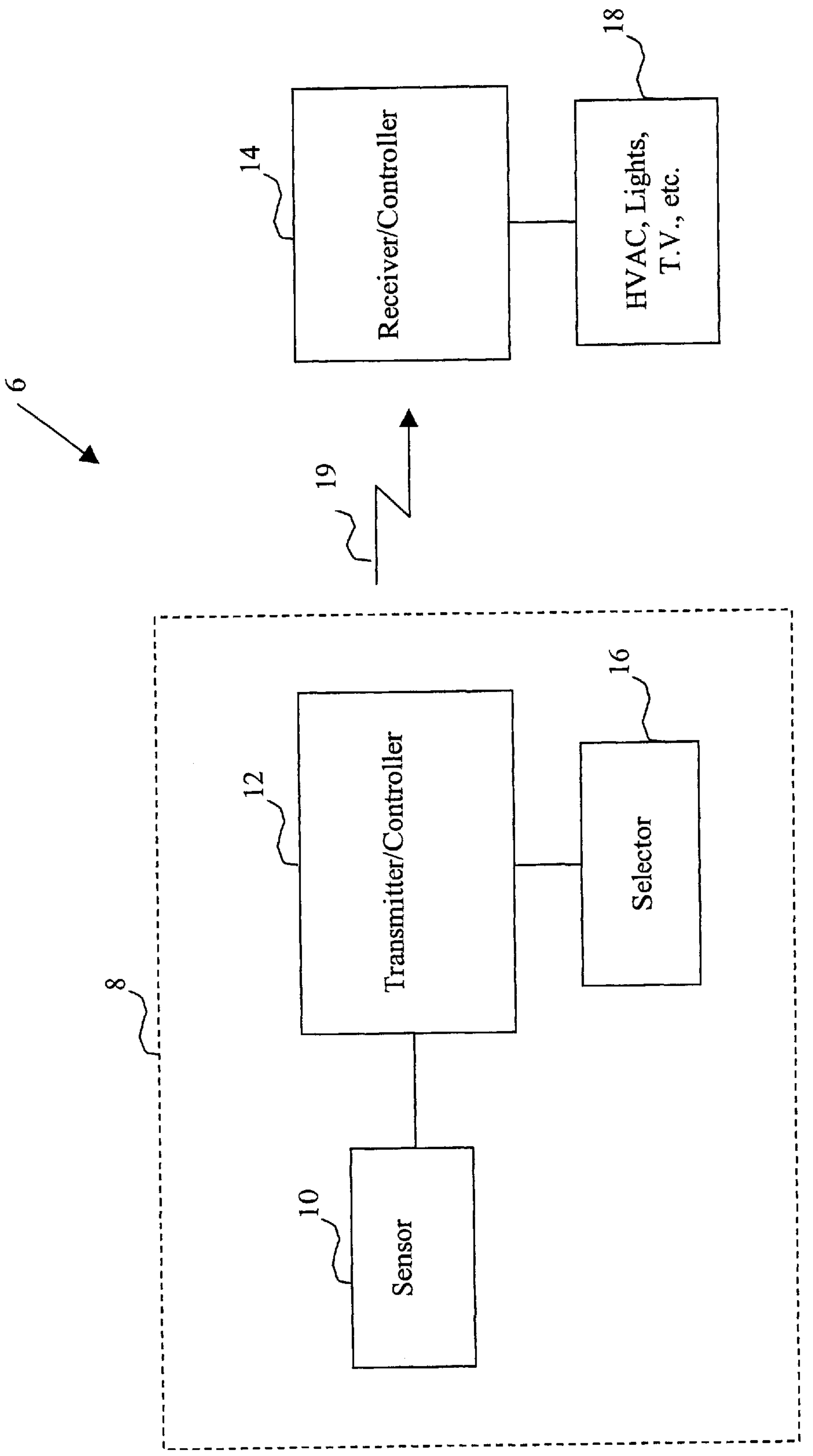
FIG. 1 depicts an exemplary system utilizing a wireless switch.

FIG. 1 depicts a system 6 using a wireless switch 8. System 6 controls room devices 18 such as thermostats and associated relays for heating, ventilation and air conditioning (HVAC) equipment, electronic locks, lighting control switches and relays, motors and switches for opening and closing drapes and other electronic equipment. A transmitter/controller 12 disposed in wireless switch 8 communicates with a receiver/controller 14. In turn, receiver/controller 14 controls functions of various room devices 18, such as those previously described. Examples of receiver/controller 14 that are commercially available are Inncom International's models e428 and F239.

Wireless switch 8 includes a sensor 10, such as a magnetic switch, pressure switch or any other known device for sensing a change of state (e.g., open/closed positions) of a barrier (not shown), such as a door, window, appliance or the like. Sensor 10 generates a sensor signal based on the change of state. Wireless switch 8 also includes a selector 16 positionable between two or more positions. Selector 16 allows a signal 19 transmitted by transmitter/controller 12 to be modified to indicate identification data. Because signal 19 transmitted by the transmitter/controller 12 can be modified, one wireless switch 8 can be uniquely identified by the receiver/controller 14 in a system 6 including a plurality of wireless switches 8. By uniquely identifying wireless switch 8, the type of barrier correlating to switch 8 is also identified. For example, selector switch 8 may correlate to a door. Even further, the selector switch 8 may correlate to a specific type of door, such as an entry door, mini-bar door, patio door (e.g., sliding or lanai), or the like. Transmitter/controller 12 transmits signal 19 indicative of the discrete state of sensor 10. The transmitted signal 19 also includes the unique identifier for wireless switch 8. Transmitted signal 19 is received by receiver/controller 14 for use in controlling room devices 18.

Figure 2:
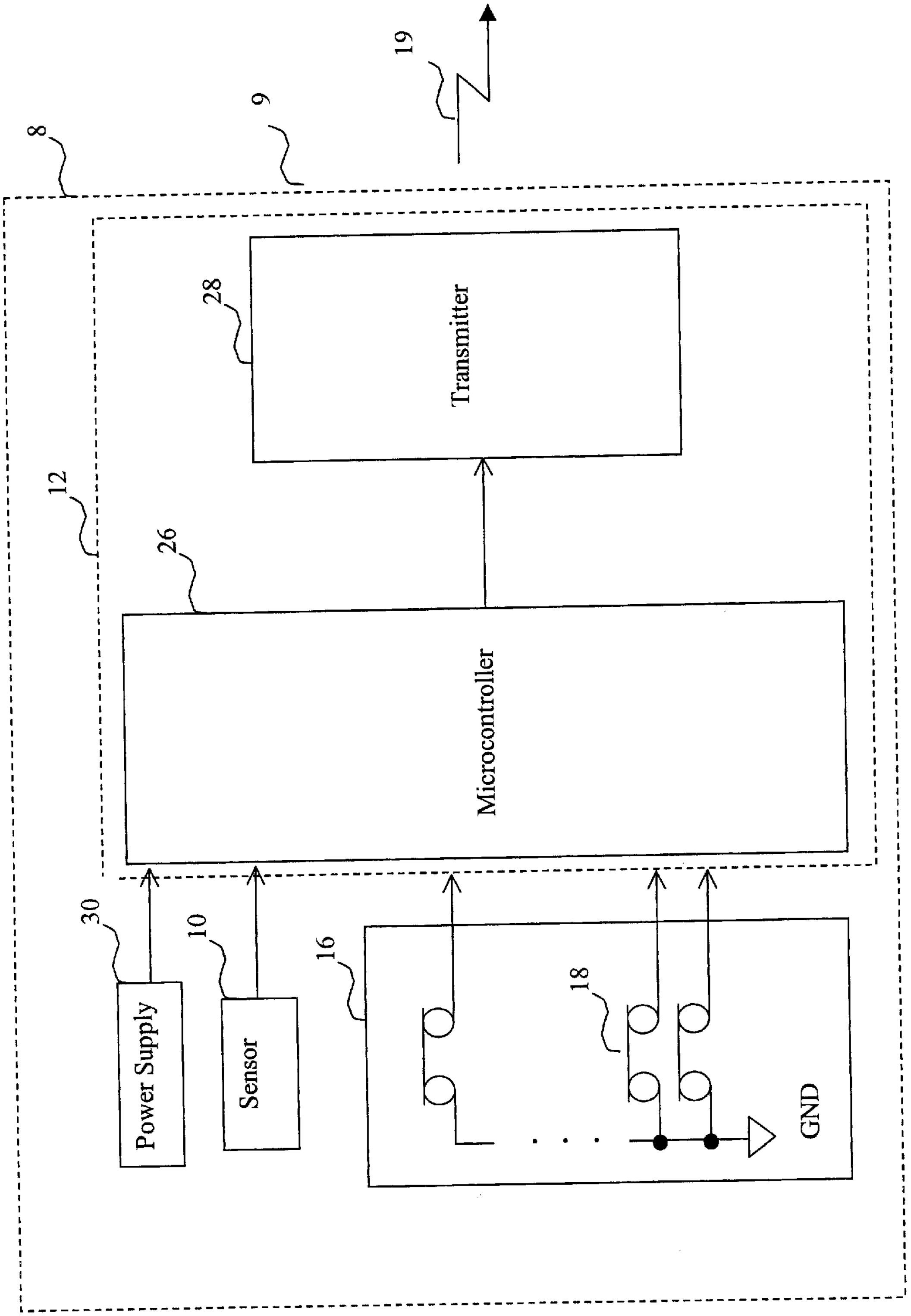
FIG. 2 is a schematic diagram of an exemplary configuration for a wireless switch.

FIG. 2 is a schematic diagram of an exemplary configuration for wireless switch 8, including a selector 16 for modifying the signal 19 transmitted by transmitter/controller 12 and, thus, uniquely identifying wireless switch 8. Wireless switch 8 also includes a sensor 10 and power supply 30 operatively coupled to a microcontroller 26. The power supply 30 may be a battery or other low-voltage power source suitable for powering the circuitry. Microcontroller 26 is operatively coupled to a transmitter 28 for sending a wireless signal 19 indicative of the state of the barrier. Selector 16 may be disposed within or external to a housing 9 for wireless switch 8. In the embodiment shown in FIG. 2, selector 16 includes a selector switch configuration having one or more selector switches 18. The selector switch configuration includes an arrangement of selector switches 18 based on a selected code for identifying wireless switch 8. For example, the selector switch configuration may include one more removable jumpers (e.g., address jumpers), a DIP switch, toggle switch, rotary switch, digital input device, or the like, including combinations thereof.

The selector switch configuration optionally includes operable connection to an I/O pin of the microcontroller 26 for setting the state of the I/O pin to ground or Vcc. In one embodiment, a particular selector switch configuration is selected by removing/adding a jumper, setting a DIP switch or toggle switch or the like. One side of the selector switch configuration is operatively coupled to one or more I/O pins and the other side operatively coupled to ground (see FIG. 2). The identity of wireless switch 8 is then determined by correlating the state of the I/O pin to a predetermined state or address table (such as a software lookup table). For example, in an embodiment having two or more removable jumpers, jumper configurations may correlate to software addresses. In turn, each software address correlates to a switch identity, which ultimately correlates to a type of door, such as a mini-bar door. The correlation is made by receiver/controller 14, so that the identity of wireless switch 8 and the state of the associated barrier can determine which room device 18 should be controlled.

As described, transmitter/controller 12 includes circuitry having microcontroller 26. However, any suitable control circuitry may be used. For example, dedicated logic and discrete circuitry is optionally used to communicate the state of the barrier and identity of switch 8. Also as described, control circuitry may be powered by a current source disposed within wireless switch 8, such as a battery. When a battery is used for the current source, wireless switch 8 requires no hard wiring for power. Signal 19 transmitted by transmitter 28 may be any wireless signal, such as infrared, radio frequency or the like. Transmitter 28 may be any suitable wireless transmitter, as is well known, and commercially available. Again, microcontroller 26 or suitable control circuitry is used for controlling the transmission of signal 19. In one embodiment, microcontroller 26 includes memory and I/O ports for communication with selector 16. Again, the selector switch configuration correlates to the state of the microcontroller's 26 I/O ports, which correlate to an address selected to identify wireless switch 8. This address, along with the signal indicating the state of the barrier, is transmitted to the receiver/controller 14.

Referring again to FIG. 1, receiver/controller 14 optionally includes a receiver for receiving wireless signal 19 transmitted by transmitter/controller 12. As with wireless transmitters, wireless receivers are well known and commercially available. Further, receiver/controller 14 includes control circuitry for controlling one or more room devices 18. For example, based on the information transmitted to receiver/controller 14, room device 18 such as a television may be turned off. Such an event may occur if the type of wireless switch 8 associated with the television is identified as correlating to a hotel room door and the state of door has changed. In another example, if the type of door ultimately identified is a mini-bar door, a signal may be sent to a hotel processor alerting the maid to check the mini-bar for restocking, etc. The control circuitry may be any conventional control means for communicating with room devices 18. In another embodiment, the control circuitry may communicate with a central control computer located with, or remote from, receiver/controller 14.

Figure 3:
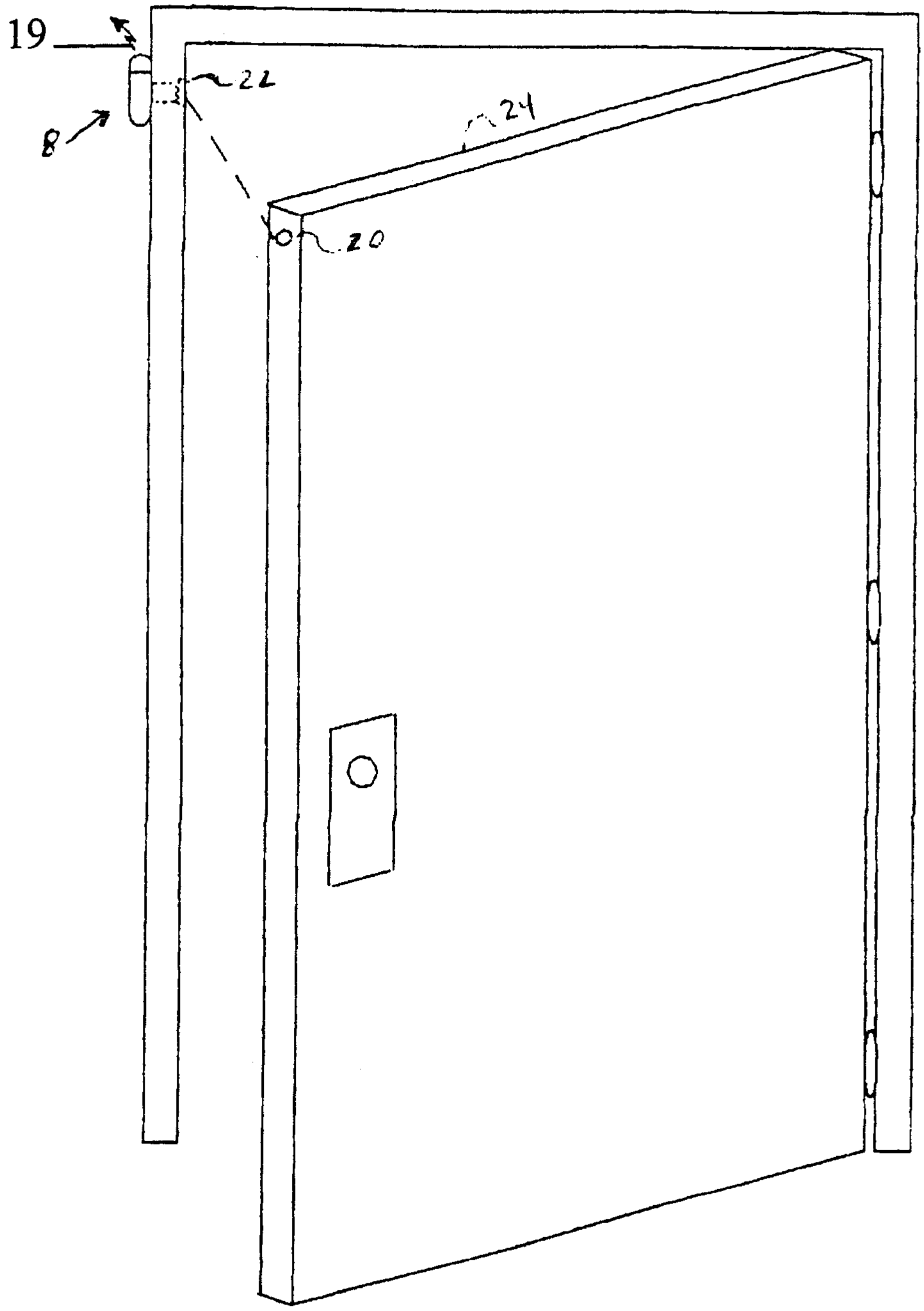
FIG. 3 depicts an exemplary mounting scheme for a wireless switch.

FIG. 3 depicts an exemplary mounting scheme for wireless switch 8. An exemplary embodiment of wireless switch 8 includes a sensor 10 (see FIG. 1) having a magnetic switch for sensing the state (open/closed) of a barrier, such as a door 24. Sensor 10 is operatively connected to microcontroller 26 within transmitter/controller 12 for communicating an open or closed state of door 24 to receiver/controller 14 via signal 19. The magnetic switch includes a first magnet 20, which is mounted to door 24, and a second magnet 22, which is mounted to a surface opposite first magnet 20 (see FIG. 3). Magnetic switches are well known and commercially available. Note that other embodiments may use any suitable sensing device for sensing when the barrier (e.g., door 24) is in a particular state, or has changed states. For example, a pressure switch may be used, such as a pressure switch for changing the state of signal 19 when the pressure is released by opening the barrier. Pressure switches are also well known and commercially available. Again, microcontroller 26 communicates the state of the barrier to a transmitter 28 disposed within transmitter/controller 12 for transmission via signal 19 to receiver/controller 14. In one embodiment, transmitter 28 is an infrared transmitter, and may transmit a directed, omnidirectional or diffused beam. As described below, an infrared diffused beam transmitter may be used for system 6 where transmitter 28 is not within the line of sight of receiver/controller 14. Such infrared transmitters are also well known and commercially available.

The wireless switch 8 of FIG. 3 optionally includes a selector 16 utilizing removable address jumpers for selecting the identity of door 24. In the example of FIG. 3, door 24 is a main door to hotel guest room, and the address jumpers are configured on I/O ports of microcontroller 26 to set the ports to a high or low state correlating to the identity of door 24. For example, in an embodiment using three I/O ports for identifying the type of door, a jumper configuration setting two I/O ports high (e.g., 5 volts) and one I/O port low (e.g., ground) may be used to identify the type of door as a main entry door. Microcontroller 26 communicates the I/O port data to transmitter for transmission to receiver/controller 14. Receiver/controller 14 is programmed to correlate the I/O port data to an identity table so that the transmitted I/O port data may be matched to a type of door.

As previously discussed, an infrared transmitter 28 for transmitting a diffused beam may be used in system 6 where transmitter 28 is not within the line of sight of receiver/controller 14. For example, wireless switch 8 in the embodiment of FIG. 3 may be located on the main door 24 to the hotel guest room. However, receiver/controller 14 may be located on a table that is not in the line of sight of door 24. The transmitter 28 may diffuse the infrared beam by using at least two light-emitting diodes (LEDs) operated simultaneously. One LED is aimed backwardly at an angle toward a wall disposed to the rear of wireless switch 8, and the other LED radiates forwardly. In general, the axes of the two LEDs may be separated by an angle of at least 90 degrees. Additional LEDs may be included to provide transmission in multiple directions. For example, two more LEDs may be aimed forwardly and upwardly, and another set aimed forwardly and downwardly. Again the axes of each pair may be separated by an angle of at least 90 degrees. Such an embodiment may include series circuits, each having two LEDs, with the series circuits being operated in parallel.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wireless switch comprising:

a sensor for sensing a change of a state of a barrier;

a selector positionable between a first position and a second position;

a transmitter operatively coupled to said sensor and said selector; and wherein said transmitter transmits a first wireless signal when said selector is positioned in said first position and said sensor senses said change of said state, and said transmitter transmits a second wireless signal different from said first signal when said selector is positioned in said second position and said sensor senses said change of said state.

2. The wireless switch of claim 1, wherein said sensor is selected from a group including: a magnetic switch, a toggle switch, an infrared switch, a pressure switch, and a light barrier switch.

3. The wireless switch of claim 1, wherein said transmitter is a diffused infrared transmitter.

4. The wireless switch of claim 3 wherein said first wireless signal is an infrared signal coded in a first pattern, and said second wireless signal is an infrared signal coded in a second pattern.

5. The wireless switch of claim 1 wherein said selector is selected from a group including: a toggle switch, a DIP switch, a jumper, a rotary switch, and a digital signal input device.

6. The wireless switch of claim 1 wherein said first wireless signal identifies a first type of barrier and said second wireless signal identifies a second type of barrier.

7. The switch of claim 1, wherein said sensor, said selector and said transmitter are disposed in a housing mountable proximate to said barrier.

8. A wireless switch comprising:

a selector configurable between a plurality of settings;

a sensor for sensing an opening of a barrier;

a transmitter operatively coupled to said selector and said sensor; and wherein said transmitter transmits a first wireless signal in response to said opening of said barrier, said first wireless signal is configured according to a setting of said selector.

9. The switch of claim 8, wherein said selector, said sensor and said transmitter are disposed in a housing mountable proximate to said barrier.

10. The switch of claim 8, wherein said sensor senses a closing of said barrier, and said transmitter transmits a second wireless signal in response to said closing of said barrier.

11. The switch of claim 8, wherein said wireless signal is an infrared signal.

12. The switch of claim 11, wherein said infrared signal is a diffused infrared signal.

13. The switch of claim 12, wherein said transmitter includes at least two simultaneously operated LEDs whose axes are separated by an angle of at least 90 degrees.

14. The switch of claim 8, wherein said barrier is selected from a group including:

a hinged door, a mini-bar door, a sliding door, a hinged window, and a sliding window.

15. The wireless switch of claim 8, wherein said sensor is selected from the group including: a magnetic switch, a toggle switch, an infrared switch, a pressure switch, and a light barrier switch.

16. The wireless switch of claim 8, wherein said selector is selected from the group including: a toggle switch, a DIP switch, a jumper, a rotary switch, and a digital signal input device.

17. The switch of claim 8, further including:

a microcontroller operatively coupled to said sensor, said sensor provides a signal to said microcontroller in response to said opening of said barrier, said microcontroller configures said first wireless signal according to said setting of said selector in response to receiving said signal from said sensor.

18. A system for a wireless switch, said system comprising:

a controller;

one or more room devices coupled to said controller;

a plurality of wireless switches, each wireless switch in said plurality of wireless switches includes:

a sensor for sensing a change of a state of a barrier proximate said sensor, a selector positionable between two or more positions, and a transmitter operatively coupled to said sensor and said selector, said transmitter transmits a wireless signal in response to said change of said state, said wireless signal having a configuration based on a position of said selector;

a receiver coupled to said controller, said receiver is positioned to receive wireless signals from said plurality of wireless switches; and wherein each selector in each wireless switch in said plurality of switches is set to a different position such that said wireless signal transmitted by each wireless switch in said plurality of wireless switches is uniquely identifiable by said controller.

19. The system of claim 18, wherein said sensor is selected from a group including: a magnetic switch, a toggle switch, an infrared switch, a pressure switch, and a light barrier switch.

20. The system of claim 18, wherein said transmitter is a diffused infrared transmitter.

21. The system of claim 1 wherein said selector is selected from a group including: a toggle switch, a DIP switch, a jumper, a rotary switch, and a digital signal input device.

22. The system of claim 1 wherein said wireless signal identifies a type of barrier.

23. The system of claim 1, wherein said sensor, said selector and said transmitter are disposed in a housing mountable proximate to said barrier.

* * * * *